Aug. 29, 1933.  R. B. TURNER  1,924,761
INCLINOMETER
Filed May 9, 1930  3 Sheets-Sheet 1

INVENTOR.
Robert B. Turner
BY
ATTORNEY.

Aug. 29, 1933.  R. B. TURNER  1,924,761
INCLINOMETER
Filed May 9, 1930    3 Sheets-Sheet 2

INVENTOR.
Robert B. Turner
BY
Philip A. H. Sewell
ATTORNEY.

Aug. 29, 1933.    R. B. TURNER    1,924,761
INCLINOMETER
Filed May 9, 1930    3 Sheets-Sheet 3

Inventor
Robert B. Turner
By Philip A. Ferrell
Attorney

Patented Aug. 29, 1933

1,924,761

UNITED STATES PATENT OFFICE 1,924,761

INCLINOMETER

Robert B. Turner, Fowler, Kans.

Application May 9, 1930. Serial No. 451,145

7 Claims. (Cl. 33—215)

The invention relates to inclinometers for use in connection with airplanes, submarines or in any other connection wherein it is desired to ascertain the position of a vehicle or other object relative to a horizontal.

A further object is to provide an inclinometer wherein the longitudinal or transverse inclination of an airplane on which the device is disposed will be indicated at all times through the medium of pointers cooperating with scales on a transparent globe, said pointers being disposed within the globe.

A further object is to rigidly support the globe in a bracket whereby it will remain in fixed relation to the airplane on which it supported, a shaft rotatably mounted transversely in the globe and having gear connection with gears carried by the globe at one end of the shaft for controlling the movement of a pointer through a pointer gear independent of the shaft and cooperating with a scale on the globe, said pointer moving in the direction of inclination.

A further object is to pivotally mount a float and pointer carrying shaft within the rotatable shaft in a manner whereby liquid within the globe will cooperate with the float of the arm for insuring a steady positive movement of the pointer carrying arm.

A further object is to provide the shaft with a longitudinal slot within which is pivotally mounted, for movement in the plane of the shaft, a float carrying shaft having a gravity actuated float at its upper end and a weighted ball at its lower end, liquid within the transparent globe for steadying the movement of the float under gravity, a shaft rockably mounted within the first mentioned shaft and rocked by the float arm mounted thereon and having a reverse gear connection with a pointer cooperating with a scale on the sphere for indicating lateral inclination.

A further object is to form the transparent sphere from semispherical members fused together, and to provide means whereby the sphere may be filled with a nonfreezing liquid with which the float and balance ball cooperate for preventing oscillation of the lateral indicator upon sudden inclination of the plane or body on which the device is mounted. Also to provide the lower ball with a mercury counterweight for rendering the same steady during the gravity control thereof.

A further object is to provide one side of the sphere with an annular flange having a closure disc held in place by a cap ring, a supporting boss carried by the disc and spaced gears carried by the disc and cooperating with a gear rotatably mounted on the shaft and carrying a pointer cooperating with a scale on the globe, said pointer moving in the direction of the inclination of the airplane.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 1:
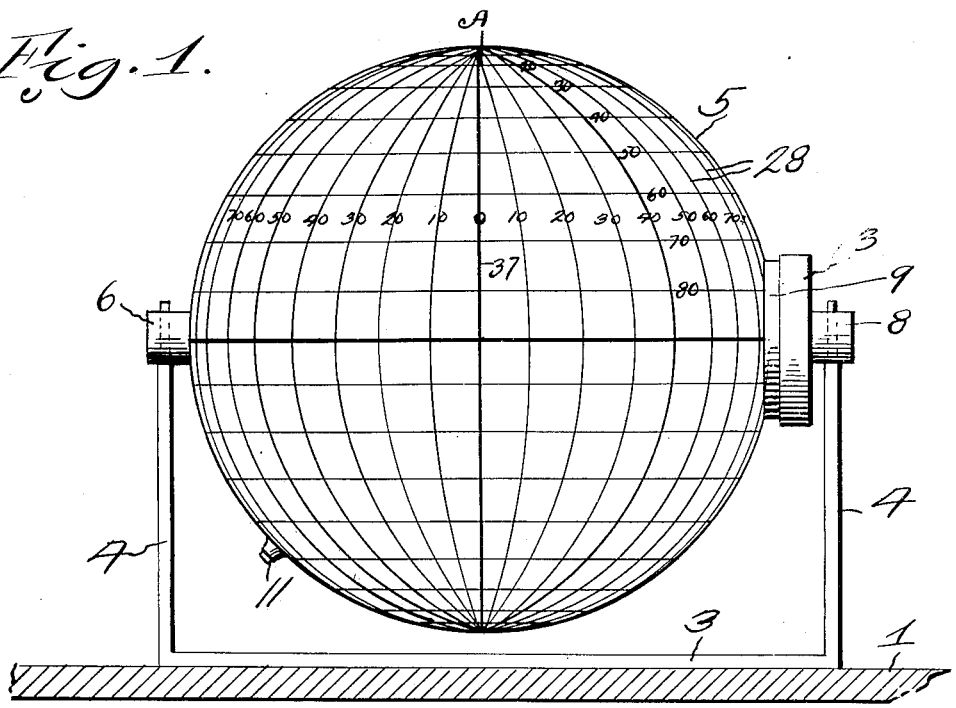
Figure 1 is a side elevation of the inclinometer.
Figure 2:
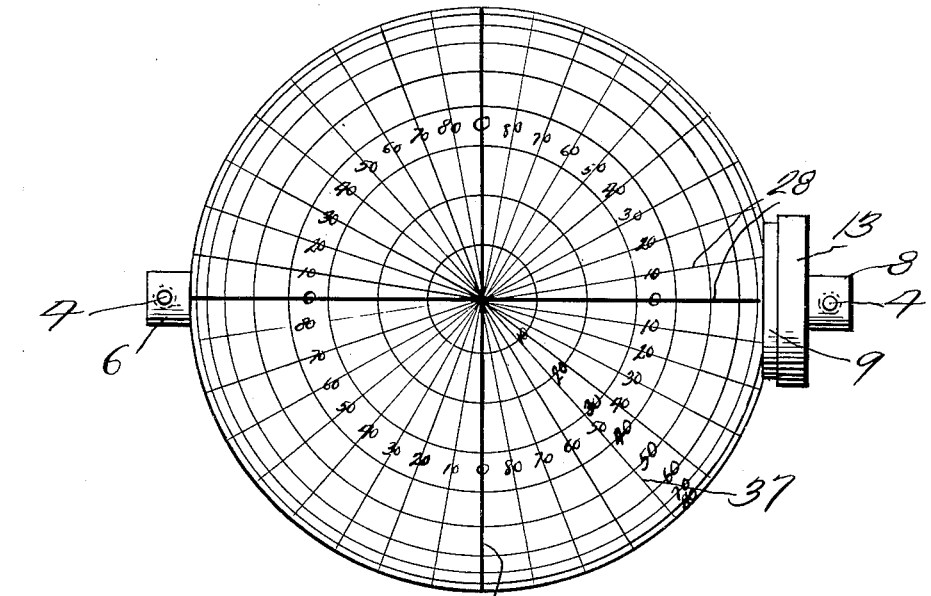
Figure 2 is a top plan view.
Figure 3:
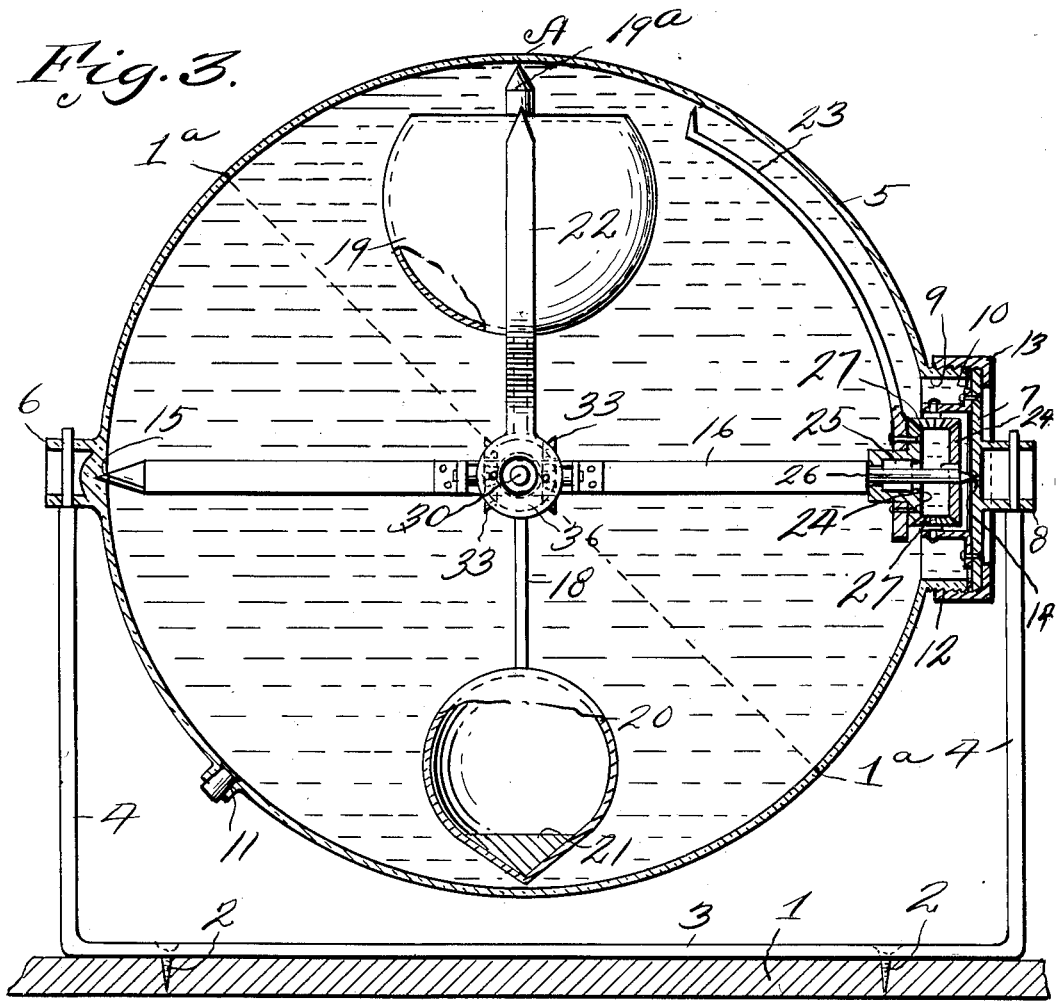
Figure 3 is a vertical transverse sectional view through the device.
Figure 4:
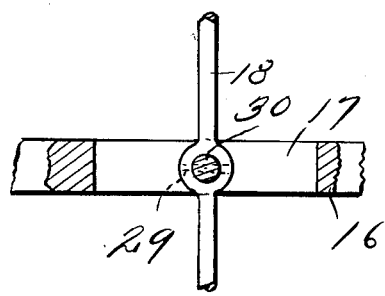
Figure 4 is a vertical transverse sectional view through a portion of the shaft showing the float arm.
Figure 5:
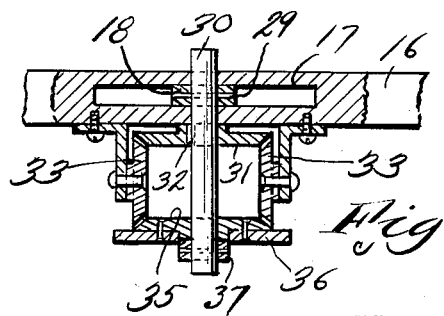
Figure 5 is a horizontal sectional view through the float controlled reverse gear carried by the shaft.
Figure 6:
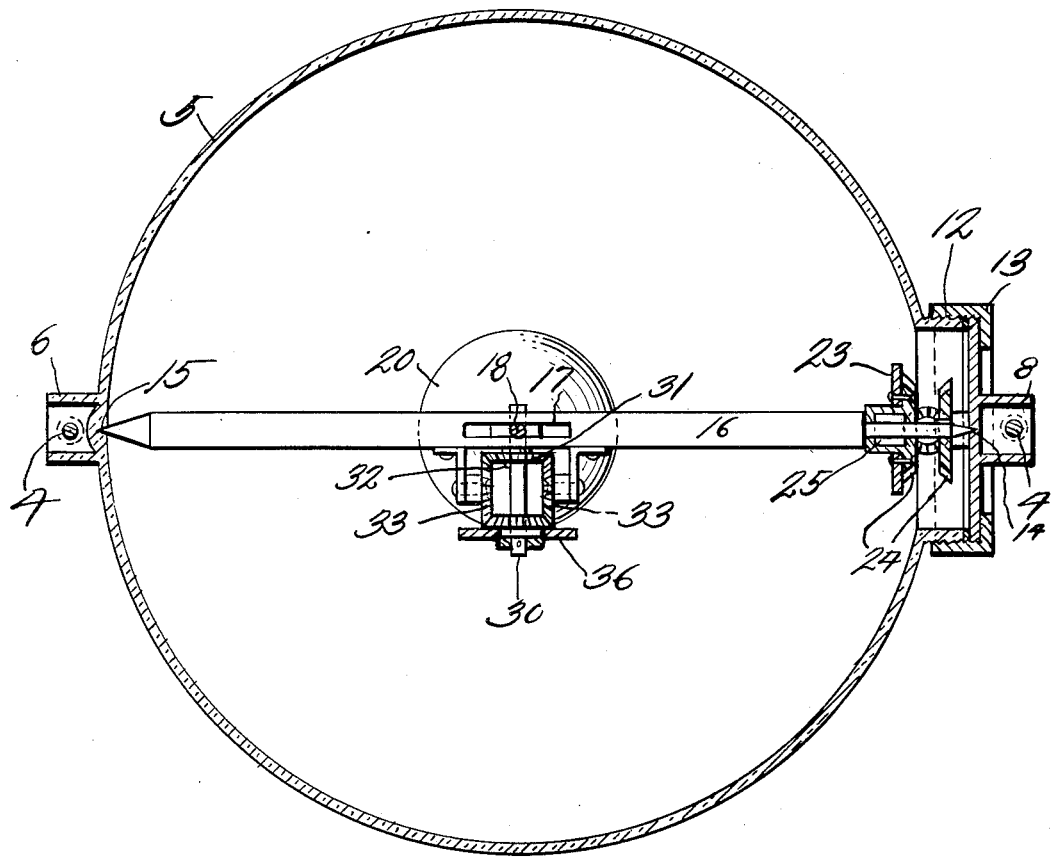
Figure 6 is a horizontal sectional view through the device.
Figure 7:
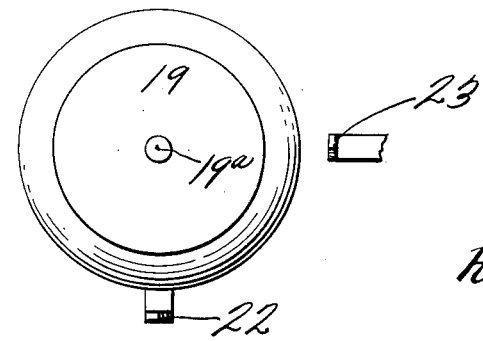
Figure 7 is a top plan view of the float showing the position of the pointers in relation thereto.

Referring to the drawings, the numeral 1 designates a support which may be a portion of an airplane or other movable device, on which an inclinometer may be used. Secured to the support 1 by means of screws 2 is a U-shaped bracket 3, the arms 4 of which extend upwardly and support the device.

Disposed between the arms 4 is a transparent member, spherically shaped, which may be formed in sections, and fused together at 1a so that the parts hereinafter set forth may be assembled within the spherical member. One side of the spherical member 5 is provided with a boss 6, through which one of the arms 4 extends, and the other side with a disc 7 having a boss 8, through which the other arm 4 extends whereby the transparent spherical member 5 is rigidly supported and will incline transversely or longitudinally with the support 1.

Disc 7 engages the outer end of the annular flange 9 of the spherical member 5, and a water tight connection is formed by a gasket 10. By providing the gasket 10, it is obvious that after the spherical member is filled with liquid through the filling opening 11, leakage is prevented. Threaded at 12 on the annular flange 9 is an annular retaining ring 13, one flange of which engages the outer side of the disc 7, and it will be seen that when the retaining ring is tightened, the disc is securely held in position. Pivotally mounted in a bearing 14 of the disc 7, and a bearing 15 at the opposite side of the spherical member is a horizontally disposed shaft 16. Extending vertically through an elongated slot 17 in the shaft 16 is an oscillating shaft 18, the upper end of which is provided with a float 19 adapted to maintain the shaft 18 in a vertical position at all times upon longitudinal or transverse inclination of the airplane or other device on which it is mounted. However to render this action more positive, the lower end of the shaft 18 is provided with a counterweight 20 having mercury 21 therein, which insures a positive action of the device.

As the spherical member 5 is filled with a liquid of non-freezing type, the liquid will act on the float 19 and its counterweight for counteracting vibration of the indicator pointers 22 and 23. Pointer 23 is carried by one of the bevelled gears 24 mounted on antifrictional bearings 25 carried by the reduced portion 26 of the shaft 16 and said gear 24 meshes with the bevelled gears 27, which in turn mesh with the other bevelled gear 24 keyed on the reduced portion 26 of the shaft 16. Gears 27 are carried by the disc 7 and mesh with gears 24, thereby forming a gear drive connection between the spherical member 5 and the pointer, which upon longitudinal inclination of the support 1 will maintain the pointer 23 in proper reading relation to degree scale 28 moving in the direction of inclination of the airplane.

The vertical arm 18 is secured by means of a pin 29 to a rock shaft 30, which extends transversely through the shaft 16 and slot 17, therefore it will be seen that upon transverse inclination of the support 1, that shaft 30 will be rocked thereby partially rotating the gear 31, keyed at 32 on the shaft 30, and through the medium of the idle gears 33, partially rotates in a reverse direction the bevel gear 35, which carries the disc 36, with which the pointer 22 is an integral part. Gear 35 is held in mesh with gears 33 by means of a collar 37 secured to shaft 30 by a pin.

Pointer 22 cooperates with a degree scale 37, lines on the transparent spherical member 5, moving in the direction of inclination of the airplane, therefore it will be seen that it will indicate the transverse inclination of the airplane or other device, and in combination with the pointer 23, the operator can easily and quickly ascertain the angle of the airplane at all times in relation to a horizontal which is particularly advantageous when flying at high altitudes, and when landing under adverse conditions, for instance in fog or at night.

Float 19 is provided with a pointer 19a which cooperates with the scales and indicates true vertical at all times and acts as means for checking indication by pointers 22 and 23.

From the above it will be seen that an inclinometer is provided which is simple in construction, and controlled by a combined float and weight member mounted in a transparent sphere, in an antifreezing liquid for instance alcohol, and provided with pointers cooperating with scales for indicating the transverse and longitudinal inclination of an airplane or other device.

The invention having been set forth what is claimed as new and useful is:

1. An inclinometer comprising a transparent spherical member, indicia carried by the spherical member, a rock shaft extending across and rockably mounted in said spherical member, means for attaching said spherical member to a movable device whereby the spherical member will remain in constant relation to the movable device, a pointer, gear train connection between said pointer and the rock shaft, said gear train comprising a gear rotatably mounted on the rock shaft, said pointer being mounted on said gear, gears carried by the spherical member and meshing with said last named gear, a gear rotatable with the rock shaft and meshing with the gears of the spherical member, a vertically disposed oscillating arm extending through the rock shaft and movable in the plane thereof, a float at the upper end of said arm, a counterweight carried by the lower end of said oscillating arm, a second pointer cooperating with the indicia on the transparent spherical member, a reverse gearing connection between the oscillating arm and the second pointer, said pointer being moved by said reversed gearing connection.

2. An inclinometer comprising a transparent spherical member, indicia on the spherical member, means for attaching said spherical member to a movable device whereby the spherical member will remain in constant relation to the movable device, a rock shaft within the spherical member, a transverse shaft in said rock shaft, a vertically disposed arm extending through the rock shaft and carried by the transverse shaft, a float carried by the upper end of said arm, a counterweight carried by the lower end of the arm, said arm being rigidly mounted on the transverse shaft extending through the rock shaft, a disc rockably mounted on the transverse shaft, a pointer carried by said disc and cooperating with the indicia on the transparent member, and a reverse gear connection between the transverse shaft and the disc.

3. An inclinometer comprising a transparent spherical member having indicia thereon, a rock shaft, a pointer cooperating with said indicia for indicating inclination in one direction of a body on which the device may be mounted, a reverse gear connection between said pointer and the rock shaft and a float carried by the rock shaft, a second pointer cooperating with the indicia on the spherical member, whereby a different inclination of the body is indicated and a reverse gearing carried by the rock shaft and in connection with the float controlling said second pointer.

4. An inclinometer comprising a transparent spherical member, means for attaching the spherical member to a movable device, means within the spherical member for indicating inclination of the movable device in one direction, means within the spherical member for indicating inclination of the movable device in a second direction, said first mentioned means including a reverse gear train, a rock shaft, said reverse gear train connecting the transparent spherical member and the rock shaft, said second mentioned means including a reverse gearing and a float means cooperating with the rock shaft and last mentioned reverse gearing.

5. An inclinometer comprising a transparent spherical member having indicia thereon, a rock shaft within the spherical member, a transverse shaft extending through the rock shaft, a vertically disposed oscillating shaft extending through the rock shaft and movable in the plane of the rock shaft, a float carried by the upper end of said oscillating shaft, means whereby the spherical member may be filled with a fluid, a counterweight carried by the lower end of said oscillating shaft, said oscillating shaft being mounted on the transverse shaft rockably mounted in the first mentioned shaft and rocking said transverse shaft, a pointer rotatably mounted on the transverse rock shaft, a gear train connection between the pointer and the transverse shaft whereby said pointer will move in the direction of inclination of the spherical member, said pointer cooperating with the indicia carried by the transparent spherical member.

6. In combination, an inclinometer comprising a transparent spherical member, a support for said inclinometer, said spherical member having indicia thereon, a float in said spherical member, a rock shaft supporting said float, a gear train carried by the rock shaft, a pointer controlled by the gear train for indicating inclination of the support, an annular flange carried by the transparent member, a disc engaging said flange, a rock shaft, one end of said rock shaft having a bearing in said disc, a pointer rockably mounted for oscillation in said rock shaft and cooperating with the indicia on the transparent member, a gear train connection between the disc and pointer, and an extension carried by said disc and forming a support for the transparent spherical member.

7. An inclinometer comprising a transparent spherical member having indicia thereon, a float controlled rock shaft in said transparent spherical member, pointers within the spherical member and cooperating with the indicia for indicating inclination of the spherical member and gear train connections between said pointers and the rock shaft whereby said pointers upon inclination of the spherical member will move in the directions of inclination.

ROBERT B. TURNER.